Jan. 9, 1968  A. T. KEPPLER  3,363,088
DOMESTIC ELECTRIC RANGE
Filed Sept. 28, 1965
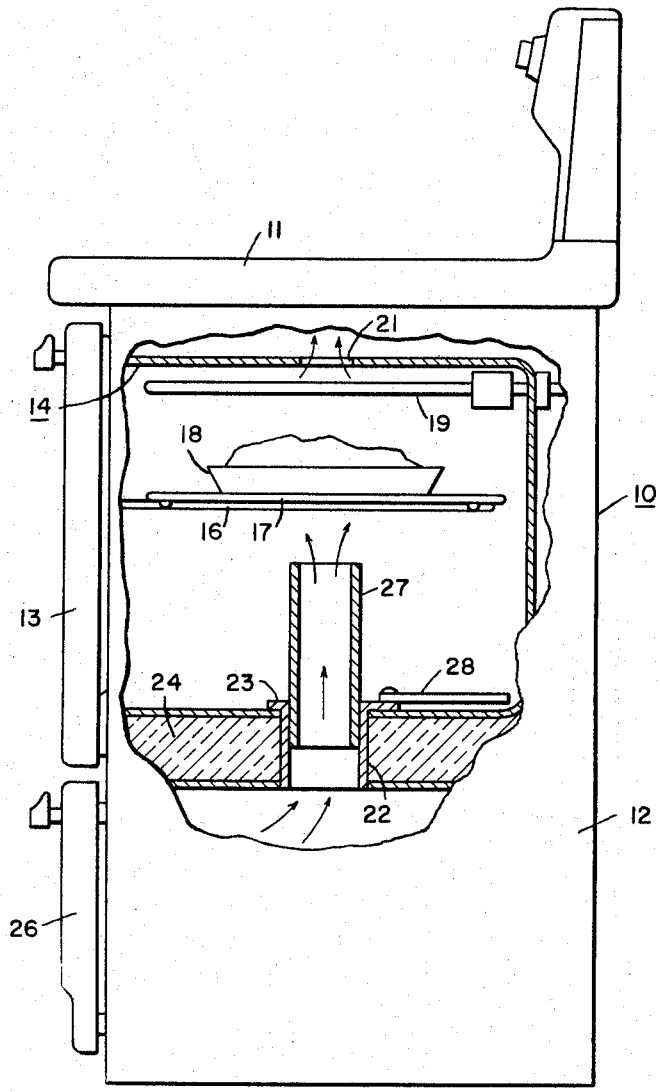
WITNESSES
INVENTOR
Arthur T. Keppler
BY
ATTORNEY

United States Patent Office 3,363,088
Patented Jan. 9, 1968

3,363,088
DOMESTIC ELECTRIC RANGE
Arthur T. Keppler, Washington, Mansfield, Ohio, assignor to Westinghouse Electric Corporation, Pittsburgh, Pa., a corporation of Pennsylvania
Filed Sept. 28, 1965, Ser. No. 490,830
2 Claims. (Cl. 219—392)

ABSTRACT OF THE DISCLOSURE

A device for improving broiling in a cooking range which device permits broiling with the oven door closed. To this end a collar provided in the bottom wall of the oven which communicates with the space below the oven has removably inserted therein a tubular member which extends from the mouth of this collar in the direction of the top wall and serves to channel air from the space below to just beneath the bottom of a broiler pan supported within the oven.

---

This invention relates, in general, to cooking ranges and, more particularly, to means for improving the broiling operation thereof.

It is common knowledge that when broiling is done with the oven door closed the food being broiled receives heat from all directions instead of radiant heat primarily from the top thereof, thereby resulting in baking or stewing instead of broiling. Furthermore, the control thermostat will, under these conditions, cycle more frequently thereby adding to these conditions. Consequently, broiling is usually carried out in conventional ovens with the oven door at least partially open, resulting in considerable heat and vapors being emitted therefrom and an appreciable rise in the cabinet temperature which cause discomfort for the person using the range.

Accordingly, it is the general object of this invention to provide a new and improved cooking range.

It is a more particular object of this invention to provide new and improved cooking apparatus suitable for closed-door broiling.

Another object of this invention is to provide means accommodating closed-door broiling in an oven which comprises a minimum number of parts, is simple in construction and inexpensive in cost.

Briefly, the above-cited objects are accomplished by providing, in an electric cooking range, a tubular member removably inserted in a collar member supported in an opening in the bottom wall of the oven liner thereby providing communication between the interior of the oven and the area below. An oven rack is provided for supporting a broiler pan beneath the broiler heating element and in a position overlying the outlet of the tubular member. Hot gases exhausted through conventional vent means suitably disposed in the top of the oven, and range cabinet, are replaced in the oven by cooler air from below the oven, which cooler air is directed, by the tubular member, over the bottom and sides of the broiler pan thereby maintaining the broiler pan and, consequently, the food therein at a suitable temperature during closed-broiling thereby minimizing the adverse effects discussed above.

Broiling of meats carried by a rotating spit interposed between the broiler heating element and the outlet of the tubular conduit or member may also be satisfactorily accomplished if desired.

Further objects and advantages of the invention will become apparent as the following description proceeds and features of novelty which characterize the invention will be pointed out in particularity in the claims annexed to and forming a part of this specificaiton.

For a better understanding of the invention, reference may be had to the accompanying drawing in which:

The figure is a side elevational view, partly broken away, of an electric cooking range incorporating the invention.

Referring to the figure, reference character 10 designates generally cooking apparatus herein disclosed by way of illustration as an electric range. The range 10 comprises a top 11 supported on a body or cabinet structure 12. An oven door structure 13 pivotally mounted by hinge means (not shown) to the body 12, at the front thereof, permits access to an oven 14 supported within the body 12 in a conventional manner.

The side walls of the oven 14 are provided with opposed ledges 16 (only one being shown) which serve to support an oven rack 17 upon which is suspended a broiler pan 18 having meat or the like disposed therein. Suitably mounted to the back wall of the oven is an upper heating element 19 and a lower heating element (not shown). The upper heating element 19 is conventionally used for broiling with the door 14 ajar while the lower heating element (not shown) is used for baking with the door 14 closed. However, in accordance with this invention, broiling with the heating element 19 may also be carried out with the oven door completely closed.

To this end the top wall of the oven 14 is provided with an opening 21 communicating with the exterior of the range 10 through the top 11 for exhausting hot gases from the oven 14 in a well known manner. An opening 22 in the bottom wall of the oven 14 has a collar 23 of generally cylindrical configuration supported therein, which collar extends through a layer of insulating material 24 into the lower portion of the body 12 occupied by a utility drawer 26. The collar 23 and an elongated tubular member 27 telescopically received in the upper end thereof form a conduit through which cooler air passes from beneath the oven 14 and the insulation 24 and is directed over the bottom and sides of the broiler pan 18. The tubular member 27 is removable from the collar 23 when not being used and may be stored in the utility drawer 26. A cover 28 pivotally secured to the collar 23 is adapted to close the top end thereof once the tubular member 27 has been removed.

While there has been shown and described what is at present considered to be the preferred embodiment of the invention, modifications thereto will readily occur to those skilled in the art. For example, the tubular member 27, instead of being removable, could be permanently supported by the collar 23 in the operative position as shown and in an inoperative position wherein the top of the tubular member 27 is substantially flush with the top of the collar 23 and the bottom thereof extends into the drawer 26. A portion of the back wall of the drawer could be removed to prevent interference with the opening of the drawer. Furthermore, the collar and tube could be provided with means cooperating to support the tube in positions intermediate the operative and inoperative positions to accommodate various positions which the rack 17 may occupy depending upon the desires of the user. It is not desired, therefore, that the invention be limited to the specific arrangement shown and described and it is intended in the appended claims that all such modifications as fall within the true spirit and scope of the invention shall be covered.

What is claimed is:

1. In cooking apparatus having an oven with a broiler heating element and a feed supporting structure including a meat holding member for supporting food therebeneath, in combination, a collar member supported in an opening in the bottom wall of said oven and extending to the area below the oven, a tubular member removably supported by said collar, said tubular member having its longitudinal axis extending from the bottom wall of the oven in the direction of the top wall and terminating beneath said food supporting structure, said collar and said tubular member forming an air conduit for channeling air from the space beneath said oven and over said food supporting structure, and means for closing said collar member when said tubular member is removed.

2. Structure as specified in claim 1, wherein said closure means comprises a substantially flat cover pivotally supported by said collar.

References Cited

UNITED STATES PATENTS

| | | | |
|---|---|---|---|
| 2,408,295 | 9/1946 | Cossin | 219—399 X |
| 3,246,690 | 4/1966 | Fry | 219—400 |

RICHARD M. WOOD, *Primary Examiner.*

C. L. ALBRITTON, *Assistant Examiner.*